(12) United States Patent
Nagaraj et al.

(10) Patent No.: US 9,118,744 B2
(45) Date of Patent: Aug. 25, 2015

(54) REPLACING LOST MEDIA DATA FOR NETWORK STREAMING

(75) Inventors: Thadi M. Nagaraj, San Diego, CA (US); Hariharan Sukumar, San Diego, CA (US); Pratik Kotkar, San Diego, CA (US); Shailesh Maheshwari, San Diego, CA (US); Daniel Amerga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 137 days.

(21) Appl. No.: 13/561,069

(22) Filed: Jul. 29, 2012

(65) Prior Publication Data

US 2014/0032987 A1    Jan. 30, 2014

(51) Int. Cl.
```
H04L 29/06      (2006.01)
H04N 19/00      (2014.01)
H04N 21/442     (2011.01)
H04N 21/643     (2011.01)
```
(Continued)

(52) U.S. Cl.
CPC ............ *H04L 65/604* (2013.01); *H04L 65/608* (2013.01); *H04L 65/80* (2013.01); *H04N 19/00* (2013.01); *H04N 21/44209* (2013.01); *H04N 21/64322* (2013.01); *H04N 21/8456* (2013.01); *H04N 21/85406* (2013.01)

(58) Field of Classification Search
CPC ..................... G11B 2220/2541; G11B 27/005; H04N 21/42646; H04N 21/4325; H04N 21/4332; H04N 21/4334; H04N 21/44008; H04N 21/8451; H04N 21/85406; H04N 5/783; H04N 5/85; H04N 9/8042; H04N 9/8063; H04N 9/8205; H04N 9/8227; H04N 19/00781; H04N 19/00939; H04N 21/23418; H04N 21/238; H04L 65/80; H04L 12/64; H04L 29/06027; H04L 65/103; H04L 65/104; H04L 65/604; H04L 65/607; H04M 2207/203
USPC ........... 714/747; 375/240.12, 240.15, 240.26, 375/240.25, E7.021, E7.027, E7.243, 375/240.13, 240.14; 386/E5.052, 343, 347, 386/345, E9.013; 348/E5.024, E9.037, 348/207.1, 575; 370/352, 401
See application file for complete search history.

(56) References Cited

U.S. PATENT DOCUMENTS 6,574,218 B1 *  6/2003  Cooklev .................. 370/352
6,594,699 B1    7/2003  Sahai et al.

(Continued)

FOREIGN PATENT DOCUMENTS

WO    WO-2007038726 A2    4/2007

OTHER PUBLICATIONS

3GPP TS 26.234 V9.1.0 ,"3rd Generation Partnership Project; Technical Specification Group Services and System Aspects; Transparent end-to-end Packet-switched Streaming Service (PSS); Protocols and codecs (Release 9)", Dec. 2009, 179 pages.

(Continued)

*Primary Examiner* — Guy Lamarre

(57) ABSTRACT

In one example, a device includes one or more processors configured to determine that data for at least a portion of a segment of media data has been lost after a remaining portion of the segment has been received via a network transmission in accordance with dynamic adaptive streaming over HTTP (DASH), based on the determination, prior to decoding the media data, add default data to the segment to replace the data that has been determined to be lost to form a replacement segment, and output media data of the replacement segment.

43 Claims, 5 Drawing Sheets

(51) Int. Cl.
*H04N 21/845* (2011.01)
*H04N 21/854* (2011.01)

(56) References Cited

U.S. PATENT DOCUMENTS

| | | | |
|---|---|---|---|
| 6,598,075 | B1 | 7/2003 | Ogdon et al. |
| 7,010,492 | B1 | 3/2006 | Bassett et al. |
| 7,764,737 | B2 | 7/2010 | Setton et al. |
| 8,001,575 | B2 | 8/2011 | Batteram et al. |
| 8,035,746 | B2 | 10/2011 | Cai et al. |
| 2004/0059983 | A1* | 3/2004 | Wang et al. .................. 714/758 |
| 2006/0146934 | A1* | 7/2006 | Caglar et al. ............ 375/240.12 |
| 2007/0186003 | A1 | 8/2007 | Foster et al. |
| 2008/0092019 | A1* | 4/2008 | Lakaniemi et al. .......... 714/776 |
| 2009/0213938 | A1 | 8/2009 | Lee et al. |
| 2010/0195742 | A1 | 8/2010 | Wu |
| 2010/0195977 | A1 | 8/2010 | Bennett et al. |
| 2010/0231797 | A1 | 9/2010 | Jiang et al. |
| 2010/0235472 | A1 | 9/2010 | Sood et al. |
| 2013/0194436 | A1* | 8/2013 | Unice ....................... 348/207.1 |

OTHER PUBLICATIONS

3GPP TS 26.244 V9.1.0, 3rd Generation Partnership Project; Technical Specification Group Services and System Aspects; Transparent end-to-end packet switched streaming service (PSS); 3GPP file format (3GP), (Release 9), Mar. 2010, 55 pp.

3GPP TS 26.247 version 10.0.0 Release 10, "Universal Mobile Telecommunications System (UMTS);LTE;Transparent end-to-end Packet-switched; Streaming Service (PSS);Progressive Download and Dynamic; Adaptive Streaming over HTTP (3GP-Dash)", year 2011.

Fielding, et al., "Hypertext Transfer Protocol-HTTP/1.1", pp. 1-6, 30-34, 152-154 (Jan. 1997).

Fielding et al., "RFC 2616: Hypertext Transfer Protocol HTTP/1.1", Internet Citation, Jun. 1999, pp. 165, XP002196143, Retrieved from the Internet: URL:http://www.rfc-editor-org/ [retrieved on Apr. 15, 2002].

International Standard ISO/IEC 14496-12, Information Technology—Coding of audio-visual objects—Part 12: ISO base media file format, Third Edition, Oct. 15, 2008, 120 pp.

ISO/IEC JTC 1/SC 29, ISO/IEC FCD 23001-6, Information technology—MPEG systems technologies—Part 6: Dynamic adaptive streaming over HTTP (DASH), Jan. 28, 2011.

Nokia Corp., "Usage of 'mfra' box for Random Access and Seeking," S4-AHI127, 3GPP TSG-SA4 Ad-Hoc Meeting, Dec. 14-16, 2009, Paris, FR, 2 pp.

Paila et al., "Flute—File Delivery over Unidirectional Transport", Network Working Group, RFC 3926, Oct. 1, 2004, The Internet Society, XP015009699, ISSN: 0000-0003.

Stockhammer, "WD 0.1 of 23001-6 Dynamic Adaptive Streaming over HTTP (DASH)", MPEG-4 Systems, International Organisation for Standardisation, ISO/IEC JTC1/SC29/WG11, Coding of Moving Pictures and Audio, MPEG 2010 Geneva/m11398, Jan. 6, 2011, 16 pp.

Wenger, et al., RFC 3984, "RTP Payload Format for H.264 Video," Feb. 2005, 84 pp.

Buchowicz A. et al., "Video Streaming Framework", Journal of Telecommunications and Information Technology, Sep. 30, 2011, pp. 102-108, XP055084615, Poland Retrieved from the Internet: URL:http://www.nit.eu/czasopisma/JTIT/2011/3/102.pdf [retrieved on Oct. 21, 2013].

International Search Report and Written Opinion—PCT/US2013/052355—ISA/EPO—Jan. 16, 2014.

Saparilla D. et al., "Optimal streaming of layered video", INFOCOM 2000 Proceedings of Nineteenth Annual Joint Conference of the IEEE Computer and Communications Societies IEEE Tel Aviv, Israel Mar. 26-30, 2000, Piscataway, NJ, USA,IEEE, US, Mar. 26, 2000, vol. 2, pp. 737-746, XP010376163, DOI: 10.1109/INFCOM.2000.832248, ISBN: 978-0-78035880-5.

Wang Y. et al., "Error Control and Concealment for Video Communication: A Review", Proceedings of the IEEE, New York, US, May 1, 1998, vol. 86, No. 5, IEEE, pp. 974-997, XP011044024, ISSN: 0018-9219.

\* cited by examiner

REPLACING LOST MEDIA DATA FOR NETWORK STREAMING

TECHNICAL FIELD

This disclosure relates to storage and transport of encoded multimedia data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), the upcoming High Efficiency Video Coding (HEVC) standard, and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into blocks. Each block can be further partitioned. Blocks in an intra-coded (I) frame or slice are encoded using spatial prediction with respect to neighboring blocks. Blocks in an inter-coded (P or B) frame or slice may use spatial prediction with respect to neighboring blocks in the same frame or slice, or may use temporal prediction with respect to other reference frames.

After video data has been encoded, the video data may be packetized for transmission or storage. The video data may be assembled into a video file conforming to any of a variety of standards, such as the International Organization for Standardization (ISO) base media file format and extensions thereof, the MP4 file format, and the advanced video coding (AVC) file format. Such packetized video data may be transported in a variety of ways, such as transmission over a computer network using network streaming.

SUMMARY

In general, this disclosure describes techniques related to mitigating errors in the context of streaming media data over a network. For example, these techniques may be used when streaming media data using Dynamic Adaptive Streaming over HTTP (DASH). Streaming of media data using DASH may be accomplished using, for example, unicast (e.g., using HTTP over TCP/IP), multicast, or broadcast (e.g., using enhanced Multimedia Broadcast Multicast Service (eMBMS)).

Media data is generally partitioned into individual media files, referred to as segments, for streaming over a network. Each of the segments may be transmitted over the network using one or more network packets. In some cases, one or more of the packets of a segment may be lost, e.g., when a packet does not arrive at all, when a packet does not arrive in time, or when data of a packet is corrupted. The techniques of this disclosure include mitigating such errors by replacing lost data with a set of default data, such as default audio and/or video data. For example, all or a portion of a lost segment may be replaced by the default audio and/or video data.

In one example, a method of presenting media data includes determining that data for at least a portion of a segment of media data has been lost after a remaining portion of the segment has been received via a network transmission in accordance with dynamic adaptive streaming over HTTP (DASH), based on the determination, prior to decoding the media data, adding default data to the segment to replace the data that has been determined to be lost to form a replacement segment, and outputting media data of the replacement segment.

In another example, a device for presenting information for media data includes one or more processors configured to determine that data for at least a portion of a segment of media data has been lost after a remaining portion of the segment has been received via a network transmission in accordance with dynamic adaptive streaming over HTTP (DASH), based on the determination, prior to decoding the media data, add default data to the segment to replace the data that has been determined to be lost to form a replacement segment, and output media data of the replacement segment.

In another example, a device for presenting information for media data includes means for determining that data for at least a portion of a segment of media data has been lost after a remaining portion of the segment has been received via a network transmission in accordance with dynamic adaptive streaming over HTTP (DASH), means for adding, based on the determination, prior to decoding the media data, default data to the segment to replace the data that has been determined to be lost to form a replacement segment, and means for outputting media data of the replacement segment.

In another example, a computer program product includes a computer-readable storage medium comprising instructions that, when executed, cause one or more processors to determine that data for at least a portion of a segment of media data has been lost after a remaining portion of the segment has been received via a network transmission in accordance with dynamic adaptive streaming over HTTP (DASH), based on the determination, prior to decoding the media data, add default data to the segment to replace the data that has been determined to be lost to form a replacement segment, and output media data of the replacement segment.

In another example, a method of sending information for media data includes determining a representation of media content to be sent to at least one client device, determining default data corresponding to the determined representation, sending the determined default data to the at least one client device to cause the at least one client device to replace lost data with the default data, and sending media data of the determined representation to the at least one client device after sending the determined default data to the at least one client device.

In another example, a device for sending information for media data includes one or more processors configured to determine a representation of media content to be sent to at least one client device and determine default data corresponding to the determined representation, and one or more network interfaces configured to send the determined default data to the at least one client device to cause the at least one client device to replace lost data with the default data, and send media data of the determined representation to the at least one client device after sending the determined default data to the at least one client device.

In another example, a device for sending information for media data includes means for determining a representation of media content to be sent to at least one client device, means for determining default data corresponding to the determined representation, means for sending the determined default data to the at least one client device to cause the at least one client device to replace lost data with the default data, and means for sending media data of the determined representation to the at least one client device after sending the determined default data to the at least one client device.

In another example, a computer program product includes a computer-readable storage medium comprises instructions that cause one or more processors to determine a representation of media content to be sent to at least one client device, determine default data corresponding to the determined representation, send the determined default data to the at least one client device to cause the at least one client device to replace lost data with the default data, and send media data of the determined representation to the at least one client device after sending the determined default data to the at least one client device.

The details of one or more examples are set forth in the accompanying drawings and the description below. Other features, objects, and advantages will be apparent from the description and drawings, and from the claims.

DETAILED DESCRIPTION

Figure 1:
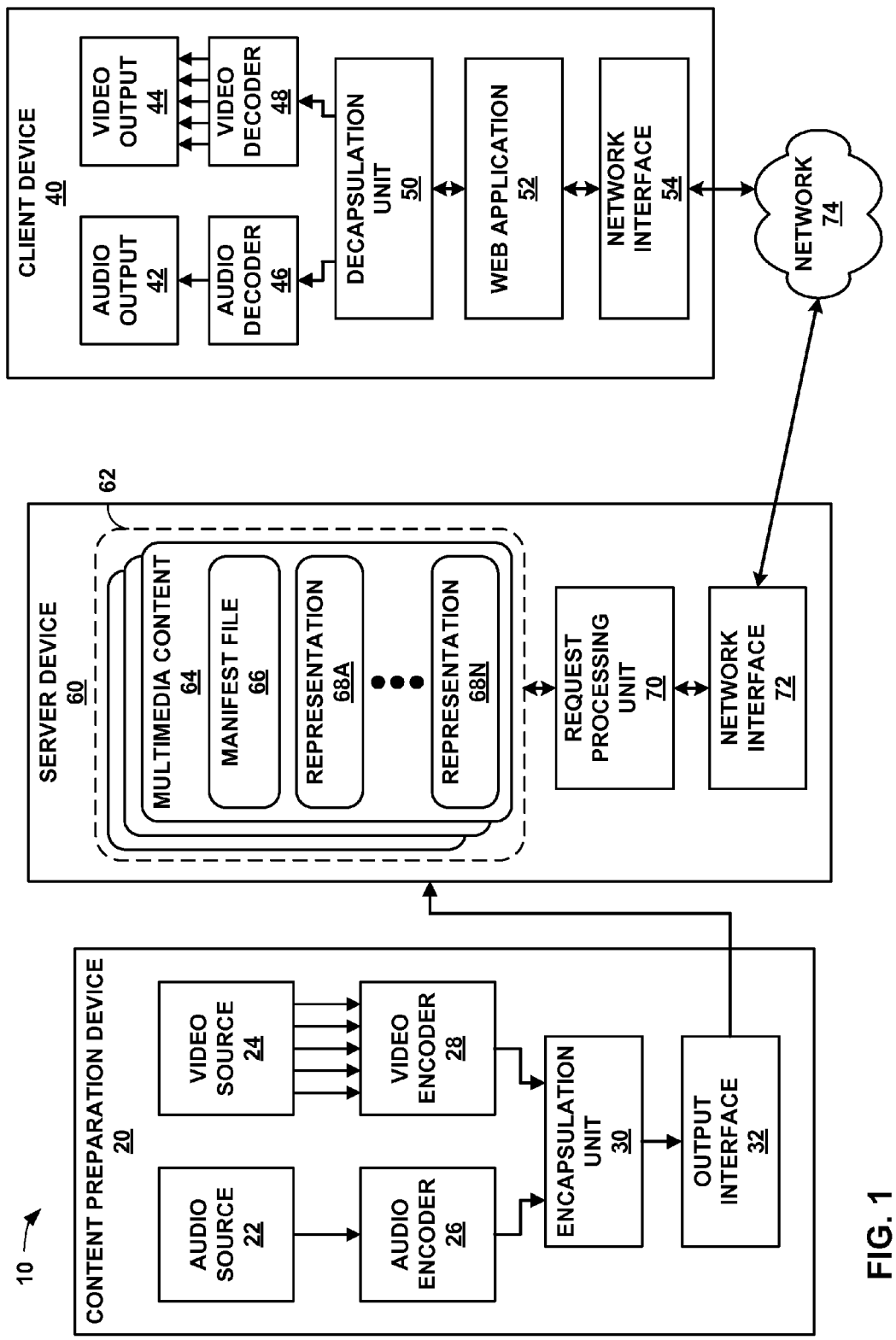
FIG. 1 is a block diagram illustrating an example system that implements techniques for streaming media data over a network.

In general, this disclosure describes techniques related to streaming of multimedia data, such as audio and video data, over a network. The techniques of this disclosure may be used in conjunction with dynamic adaptive streaming over HTTP (DASH). This disclosure describes various techniques that may be performed in conjunction with network streaming, any or all of which may be implemented alone or in any combination. As described in greater detail below, various devices performing network streaming may be configured to implement the techniques of this disclosure.

In accordance with DASH and similar techniques for streaming data over a network, multimedia content (such as a movie or other media content, which may also include audio data, video data, text overlays, or other data) may be encoded in a variety of ways and with a variety of characteristics. A content preparation device may form multiple representations of the same multimedia content. Each representation may correspond to a particular set of characteristics, such as coding and rendering characteristics, to provide data usable by a variety of different client devices with various coding and rendering capabilities.

Moreover, representations having various bitrates may allow for bandwidth adaptation. For example, a client device may determine an amount of bandwidth that is currently available and select a representation based on the amount of available bandwidth, along with coding and rendering capabilities of the client device. Client devices using DASH to perform bandwidth adaptation may retrieve media data using a unicast network protocol, such as HTTP. Alternatively or additionally, a server device may select an appropriate representation for broadcast or multicast. For example, the server device may send media data of one of the representations to an Internet protocol (IP) address associated with a multicast group, and client devices may request to join the group in order to receive the media data.

In general, DASH provides techniques for streaming media data over a network. For example, as discussed above, DASH may be used in conjunction with unicast, broadcast, or multicast network protocols. In some instances, errors may occur that result in the loss of media data. Loss of media data may occur when, for example, a packet is not delivered or when data of the packet is corrupted. For a broadcast or multicast network session, a server device is typically configured to continue streaming packets of the broadcast session, and thus, a client device may not have the opportunity to request retransmission of lost or corrupted packets from the server device. Moreover, waiting until retransmitted packets arrive may cause a delay in playback, which could negatively impact a user's experience. Thus, in many cases, when one or more packets are lost or corrupted, a client device would simply display a blank screen with no audio, then resume playback after receiving subsequent packets without errors.

The techniques of this disclosure are generally directed to improving a user's experience in the scenario of transmitting (e.g., unicasting, multicasting, or broadcasting) media data according to DASH or similar streaming network protocols. Rather than displaying a blank screen with no audio when one or more packets are lost, a client device may be configured with predetermined (or default) audio and/or video data to present when data is lost. In this manner, when the client device detects packet loss or corruption, the client device may switch to the predetermined audio and/or video data. This predetermined audio and/or video data may include, for example, a network logo screen, a network theme song, a seasonally relevant display, a content-relevant display (e.g., a football field for a football game), or other such data. In general, this disclosure refers to data that has been "lost" as including data from packets that never arrived, packets that arrived too late to be useful, and packets that have arrived but that have been corrupted. Likewise, the predetermined audio data may include content-relevant audio, such as crowd noise for a sporting event.

In some cases, audio data may be lost without losing video data, in which case received video data may be displayed without the audio. Alternatively, if closed captioning data has been received when audio has not been received, the client device may automatically begin displaying closed captions when audio data has been lost. Likewise, video data may be lost without losing audio data, in which case a default video may be displayed and the received audio data may be presented. In this manner, these techniques may improve a user's experience in the case of packet loss or packet corruption.

In various examples, the audio and/or video data to be presented may be pre-stored on the client device (e.g., in configuration data of the client device), initially sent from the server device to the client device (e.g., at the beginning of the broadcast), periodically sent (which may be the same default data periodically sent, or new default data may be sent at each period), sent as side information (that is, as a separate transmission, e.g., in response to a unicast request) during a broadcast or multicast, or otherwise transmitted from the server device to the client device one or more times.

Typically, media data is arranged into a sequence of segments. Each segment may correspond to a particular temporal section of the media data, and may have a particular duration, e.g., two seconds. The segment may include a plurality of media fragments, which may correspond to individual frames or slices of video data. The segment may also include header data that describes locations of the media fragments, e.g., byte offsets to the media fragments and corresponding temporal positions of the media fragments. Segments may correspond to individual files, e.g., of a playback duration of two to ten seconds, or longer. Each of the files may be addressable by a particular uniform resource locator (URL) for unicast. A client device may submit an HTTP GET request for a file at a particular URL to retrieve the file, in the example of unicast.

Data of a segment may be encapsulated within separate packets. In accordance with the techniques of this disclosure, when some, but not all, of the packets of a segment are received, the client device may attempt to use as much of the segment as possible, and fill in the remainder of the segment (corresponding to lost data) with the default audio and/or video data. This may include, for example, reading uncorrupted data of received packets to determine identifying information for media data thereof.

Thus, a client device may be configured with a template corresponding to the default audio and video data. When data from one or more packets of a segment are lost (e.g., due to not arriving, arriving too late, or corruption), the client device may use the template to construct the remainder of the segment by inserting the default audio and video data at positions corresponding to the lost data. The template may provide fields in which to insert timing information that the client device may fill in when reconstructing the segment. The client device may further modify header data of the segment, to reflect the addition of the default data, e.g., to ensure proper retrieval of data from the modified segment.

For example, pictures of a coded video sequence are typically identified using either or both of a frame number (frame_num) value and a picture order count (POC) value, where the frame_num value generally indicates a decoding order of the picture and the POC value generally indicates an output or display order of the picture. In order to utilize the default video data, a client device may use the frame_num and/or POC values of received video data to determine appropriate frame_num and/or POC values of the default video data. In some examples, the default video data may begin with a random access point (RAP) corresponding to an instantaneous decoder refresh (IDR) picture. Depending on the relevant video coding standard, the client device may set the frame_num value of the IDR picture accordingly. For example, the ITU-T H.264/AVC (advanced video coding) standard dictates that IDR pictures shall have a frame_num value of "0." Moreover, the amount of default data to be inserted may depend on the amount of lost or corrupted data. Therefore, the range of POC values to use may also depend on the number of pictures of the default video data to be used as a replacement for the lost or corrupted data.

As discussed above, the techniques of this disclosure may be used in conjunction with a streaming network protocol, such as DASH. DASH is useful for delivery of streamed content over a variety of mobile networks. In fact, DASH can be used effectively in a broadcast network like eMBMS (enhanced Multimedia Broadcast Multicast Service), where DASH segments may be broadcast over a network to a multicast service client (which may be implemented on a client device) and then streamed to a DASH client using HTTP. Examples of techniques for using DASH in a multicast network are described in Stockhammer et al., "NETWORK STREAMING OF VIDEO DATA USING BYTE RANGE REQUESTS," U.S. patent application Ser. No. 13/439,556, filed Apr. 4, 2012.

Nevertheless, as discussed above, broadcast networks, like other computer networks, may suffer from packet loss, which may result in lost segments. This can result in a poor user experience. In the presence of random errors, the multicast service client may be unable to deliver a segment to a DASH client, and the DASH HTTP interface may not have any mechanism to indicate such loss to the DASH client, outside of the techniques of this disclosure. Thus, the techniques of this disclosure may be used to provide a simple, clean mechanism to overcome packet and segment errors, to provide an improved user experience to an end user.

In particular, in accordance with the techniques of this disclosure, in the presence of random network errors, a multicast service client may receive some of the packets of a DASH segment, but not the entire segment. In some examples, the multicast service client may send an HTTP Response "404" message to the DASH client, indicating that the complete DASH segment has not been received. The DASH client and multimedia player may then introduce skips or error resiliency to overcome the segment loss. However, in accordance with the techniques of this disclosure, the multicast service client can perform a variety of steps to overcome packet loss.

For example, the multicast service client may send data of a default segment that is stored in non-volatile storage in the case of a segment error. Thus, when the DASH client receives the default segment, it can enable error resiliency measures. As another example, a default segment that is stored in non-volatile memory may be presented when a blank screen would otherwise be presented for an extended period of time. That is, the multimedia player may detect that no media data has been received for presentation for a certain number of frames, and may thus begin playing default media data, rather than continuing to present a blank screen on the display of the device executing the media player. As yet another example, in the event that some parts of a DASH segment are received but there are missing pieces, the multicast service client may use received packets of the segment and a stored default segment to generate an interpolated version of the DASH segment, also referred to herein as a replacement segment. The replacement segment can be sent to the DASH client, which may cause data of the replacement segment to be played by the media player. In some examples, a multicast service client may maintain a historical record of received segments and generate an interpolated version of the missing parts of a DASH segment.

Video files, such as segments of representations of media content, may conform to video data encapsulated according to any of ISO base media file format, Scalable Video Coding (SVC) file format, Advanced Video Coding (AVC) file format, Third Generation Partnership Project (3GPP) file format, and/or Multiview Video Coding (MVC) file format, or other similar video file formats.

The ISO Base Media File Format is designed to contain timed media information for a presentation in a flexible, extensible format that facilitates interchange, management, editing, and presentation of the media. ISO Base Media File format (ISO/IEC 14496-12:2004) is specified in MPEG-4 Part-12, ISO/IEC JTC1/SC29/WG11, "ISO/IEC 14496—Coding of Audio-Visual Objects," ISO Base Media File Format, 2010, which defines a general structure for time-based media files. The ISO Base Media File format is used as the basis for other file formats in the family such as the AVC file format (ISO/IEC 14496-15) defined support for H.264/MPEG-4 AVC video compression, 3GPP file format, SVC file format, and MVC file format. The 3GPP file format and MVC file format are extensions of the AVC file format. ISO base media file format contains the timing, structure, and media information for timed sequences of media data, such as audio-visual presentations. The file structure may be object-oriented. A file can be decomposed into basic objects very simply and the structure of the objects is implied from their type.

Files conforming to the ISO base media file format (and extensions thereof) may be formed as a series of objects, called "boxes." Data in the ISO base media file format may be contained in boxes, such that no other data needs to be contained within the file and there need not be data outside of boxes within the file. This includes any initial signature required by the specific file format. A "box" may be an object-oriented building block defined by a unique type identifier and length. Typically, a presentation is contained in one file, and the media presentation is self-contained. The movie container (movie box) may contain the metadata of the media and the video and audio frames may be contained in the media data container and could be in other files.

A representation (motion sequence) may be contained in several files, sometimes referred to as segments. Timing and framing (position and size) information is generally in the ISO base media file and the ancillary files may essentially use any format. This presentation may be 'local' to the system containing the presentation, or may be provided via a network or other stream delivery mechanism.

When media is delivered over a streaming protocol, the media may need to be transformed from the way it is represented in the file. One example of this is when media is transmitted over the Real-time Transport Protocol (RTP). In the file, for example, each frame of video is stored contiguously as a file-format sample. In RTP, packetization rules specific to the codec used must be obeyed to place these frames in RTP packets. A streaming server may be configured to calculate such packetization at run-time. However, there is support for the assistance of the streaming servers.

The techniques of this disclosure may be applicable to network streaming protocols, such as HTTP streaming, e.g., in accordance with dynamic adaptive streaming over HTTP (DASH). In HTTP streaming, frequently used operations include GET and partial GET. The GET operation retrieves a whole file associated a given uniform resource locator (URL) or other identifier, e.g., URI. The partial GET operation receives a byte range as an input parameter and retrieves a continuous number of bytes of a file corresponding to the received byte range. Thus, movie fragments may be provided for HTTP streaming, because a partial GET operation can get one or more individual movie fragments. Note that, in a movie fragment, there can be several track fragments of different tracks. In HTTP streaming, a media representation may be a structured collection of data that is accessible to the client. The client may request and download media data information to present a streaming service to a user.

In the example of streaming 3GPP data using HTTP streaming, there may be multiple representations for video and/or audio data of multimedia content. The manifest of such representations may be defined in a Media Presentation Description (MPD) data structure. A media representation may correspond to a structured collection of data that is accessible to an HTTP streaming client device. The HTTP streaming client device may request and download media data information to present a streaming service to a user of the client device. A media representation may be described in the MPD data structure, which may include updates of the MPD.

Each period may contain one or more representations for the same media content. A representation may be one of a number of alternative encoded versions of audio or video data. The representations may differ by various characteristics, such as encoding types, e.g., by bitrate, resolution, and/or codec for video data and bitrate, language, and/or codec for audio data. The term "representation" may be used to refer to a section of encoded audio or video data corresponding to a particular period of the multimedia content and encoded in a particular way.

Representations of a particular period may be assigned to a group, which may be indicated by a group attribute in the MPD. Representations in the same group are generally considered alternatives to each other. For example, each representation of video data for a particular period may be assigned to the same group, such that any of the representations may be selected for decoding to display video data of the multimedia content for the corresponding period. The media content within one period may be represented by either one representation from group 0, if present, or the combination of at most one representation from each non-zero group, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may be uniquely referenced by an identifier, such as a uniform resource locator (URL). The MPD may provide the identifiers for each segment. In some examples, the MPD may also provide byte ranges in the form of a range attribute, which may correspond to the data for a segment within a file accessible by the URL.

Each representation may also include one or more media components, where each media component may correspond to an encoded version of one individual media type, such as audio, video, and/or timed text (e.g., for closed captioning). Media components may be time-continuous across boundaries of consecutive media segments within one representation. Thus, a representation may correspond to an individual file or a sequence of segments, each of which may include the same coding and rendering characteristics.

It should be understood that the techniques of this disclosure to replace lost data with template data, e.g., default audio and video data, may be performed on media segments, which may be transmitted in the form of one or more network packets. When data of the packets becomes corrupted, the techniques of this disclosure may include replacing audio and/or video data of the portion of the packets that was corrupted with the default data of the template. Accordingly, the default data may be separate, independent audio and/or video data, rather than attempting to correct for corruption or loss using other techniques, such as forward error correction (FEC).

Moreover, the replacement data (that is, the default data) may be relatively unrelated to surrounding data that was actually received and properly decodable, that is, other than a potential, general subject matter relationship (e.g., determining default data based on the subject matter of the media content). For example, rather than replacing the lost or corrupted data by repeating or replaying one or more properly decoded pictures or properly decoded audio samples, the lost media data may be replaced by default data that is separately transmitted, e.g., in advance of the actual media data. Thus, the default data may be injected into the bitstream by a client device, or other relatively downstream network device, at the segment layer in the event that data loss at the segment layer is detected. Moreover, by replacing lost media data with template data, a video decoder or audio decoder may decode the default audio or video data normally, without needing to make a determination at the decoder layer that any loss has occurred.

FIG. 1 is a block diagram illustrating an example system 10 that implements techniques for streaming media data over a network. In this example, system 10 includes content preparation device 20, server device 60, and client device 40. Client device 40 and server device 60 are communicatively coupled by network 74, which may comprise the Internet. In some examples, content preparation device 20 and server device 60 may also be coupled by network 74 or another network, or may be directly communicatively coupled. In some examples, content preparation device 20 and server device 60 may comprise the same device. In some examples, content preparation device 20 may distribute prepared content to a plurality of server devices, including server device 60. Similarly, client device 40 may communicate with a plurality of server devices, including server device 60, in some examples.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60, e.g., directly from a storage medium or from another server device.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured by audio source 22 contemporaneously with video data captured by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

As an example, H.264/AVC, like many video coding standards, defines the syntax, semantics, and decoding process for error-free bitstreams, any of which conform to a certain profile or level. H.264/AVC does not specify the encoder, but the encoder is tasked with guaranteeing that the generated bitstreams are standard-compliant for a decoder. In the context of video coding standard, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and macroblock (MB) processing rate. A profile may be signaled with a profile_idc (profile indicator) value, while a level may be signaled with a level_idc (level indicator) value.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile. Various representations of multimedia content may be provided to accommodate various profiles and levels of coding within H.264, as well as to accommodate other coding standards, such as the upcoming High Efficiency Video Coding (HEVC) standard.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a particular level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define, for example, limitations on the number of blocks that need to be processed, decoded picture buffer (DPB) size, coded picture buffer (CPB) size, vertical motion vector range, maximum number of motion vectors per two consecutive MBs, and whether a B-block can have sub-block partitions less than 8×8 pixels. In this manner, a decoder may determine whether the decoder is capable of properly decoding the bitstream.

Video compression standards such as ITU-T H.261, H.262, H.263, MPEG-1, MPEG-2, H.264/MPEG-4 part 10, and the upcoming High Efficiency Video Coding (HEVC) standard, make use of motion compensated temporal prediction to reduce temporal redundancy. The encoder, such as video encoder 28, may use a motion compensated prediction from some previously encoded pictures (also referred to herein as frames) to predict the current coded pictures according to motion vectors. There are three major picture types in typical video coding. They are Intra coded picture ("I-pictures" or "I-frames"), Predicted pictures ("P-pictures" or "P-frames") and Bi-directional predicted pictures ("B-pictures" or "B-frames"). P-pictures may use the reference picture before the current picture in temporal order. In a B-picture, each block of the B-picture may be predicted from one or two reference pictures. These reference pictures could be located before or after the current picture in temporal order.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data. In accordance with the techniques of this disclosure, video encoder 28 may encode default video data, to be used as a substitute for lost video data, and audio encoder 26 may encode default audio data, to be used as a substitute for lost audio data. Thus, as explained below, in the event that one or more packets of a segment of media data are lost (e.g., corrupted or do not arrive in time to be useful), client device 40 may substitute the default audio and/or video data for the lost audio and/or video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise a combination of audio data and video data, e.g., one or more audio elementary stream and one or more video elementary streams. Each PES packet may include a stream_id that identifies the elementary stream to which the PES packet belongs. Encapsulation unit 30 is responsible for assembling elementary streams into video files of various representations.

Encapsulation unit 30 receives PES packets for elementary streams of a representation from audio encoder 26 and video encoder 28 and forms corresponding network abstraction layer (NAL) units from the PES packets. In the example of H.264/AVC (Advanced Video Coding), coded video slices are organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain data for the core compression engine and may include block and/or slice level data. Other NAL units may be non-VCL NAL units. In some examples, a coded picture in one time instance, normally presented as a primary coded picture, may be contained in an access unit, which may include one or more NAL units.

Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture, hence coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points. In addition, encapsulation unit 30 may form a manifest file, such as a media presentation descriptor (MPD) that describes characteristics of the representations. Encapsulation unit 30 may format the MPD according to extensible markup language (XML).

Encapsulation unit 30 may provide data for one or more representations of multimedia content, along with the manifest file (e.g., the MPD) to output interface 32. Output interface 32 may comprise a network interface or an interface for writing to a storage medium, such as a universal serial bus (USB) interface, a CD or DVD writer or burner, an interface to magnetic or flash storage media, or other interfaces for storing or transmitting media data. Encapsulation unit 30 may provide data of each of the representations of multimedia content to output interface 32, which may send the data to server device 60 via network transmission, direct transmission, or storage media. In the example of FIG. 1, server device 60 includes storage medium 62 that stores various multimedia content 64, each including a respective manifest file 66 and one or more representations 68 (e.g., representations 68A-68N).

In accordance with the techniques of this disclosure, a template may be used to indicate default audio and/or video data to be presented in the event of loss of media data. In some examples, multiple templates may be provided. The template data may be stored in storage medium 62 and sent (once or periodically) to client device 40. In some examples, manifest file 66 may include data indicating a relevant template to use for one of representations 68 or particular portions of representations 68. For example, an MPD, instantiating manifest file 66, may specify one or more templates for one or more temporal periods. Thus, if media data for one of the corresponding temporal periods is lost, client device 40 may determine an appropriate template, and use the template to replace the lost media data, e.g., either or both of lost audio or video data.

Additionally or alternatively, a PPS, an SPS, or an SEI message may be used to indicate relevant template data. For example, an SEI message may include a template ID that identifies a template for a sequence of video data following the SEI message. The template and corresponding default audio and video data may be transmitted in a separate communication, e.g., identifiable by one or more unique NAL units allocated specifically to template data.

In some examples, the template data may be treated as an external period. Server device 60 may send the data for the external period (that is, the template data, including default video and audio data and timing data indicating how to insert the audio and/or video data into a bitstream) to client device 40 prior to sending data of one of representations 68 to client device 40. Server device 60 may also periodically send the template data—e.g., once per period, once per segment, once every N minutes, periods, or segments (where N is an integer or rational number)—or at other intervals or in other non-periodic manners.

In some examples, content preparation device 20 may provide the template data, which may include default audio and video data. That is, content preparation device 20 may encode default audio and/or video data for media content and send template data including the default audio and video data to server device 60. In other examples, server device 60 may provide the template data, e.g., from previously encoded default audio and/or video data. In still other examples, both content preparation device 20 and server device 60 may provide the template data. For example, content preparation device 20 may produce a plurality of different sets of template data, and server device 60 may select an appropriate one of the plurality of sets of template data. In any case, server device 60 may provide template data to client device 40 in accordance with the techniques of this disclosure.

Server device 60 includes request processing unit 70 and network interface 72. In some examples, server device 60 may include a plurality of network interfaces, including network interface 72. Furthermore, any or all of the features of server device 60 may be implemented on other devices of a content distribution network, such as routers, bridges, proxy devices, switches, or other devices. In some examples, intermediate devices of a content distribution network may cache data of multimedia content 64, and include components that conform substantially to those of server device 60. In general, network interface 72 is configured to send and receive data via network 74.

Request processing unit 70 is configured to receive network requests from client devices, such as client device 40, for data of storage medium 72. For example, request processing unit 70 may implement hypertext transfer protocol (HTTP) version 1.1, as described in RFC 2616, "Hypertext Transfer Protocol—HTTP/1.1," by R. Fielding et al, Network Working Group, IETF, June 1999. That is, request processing unit 70 may be configured to receive HTTP GET or partial GET requests and provide data of multimedia content 64 in response to the requests. The requests may specify a segment of one of representations 68, e.g., using a URL of the segment. In some examples, the requests may also specify one or more byte ranges of the segment. In some examples, byte ranges of a segment may be specified using partial GET requests. Request processing unit 70 may further be configured to service HTTP HEAD requests to provide header data of a segment of one of representations 68. In any case, request processing unit 70 may be configured to process the requests to provide requested data to a requesting device, such as client device 40.

In some examples, client device 40 may be configured to request template data for selected multimedia content, e.g., template data for multimedia content 64. In other examples, server device 60 may send the template data to client device 40, e.g., once or periodically, whether or not client device 40 specifically requested the template data. For example, assuming that client device 40 uses a unicast network connection to retrieve data of multimedia content 64, manifest file 66 may indicate template data for one or more of representations 68. Thus, client device 40 may initially request the template data such that, in the event that data of a segment is lost, client device 40 may replace the lost data with the default audio and/or video data of the template.

Alternatively, server device 60 may be configured to broadcast or multicast data of multimedia content 64, e.g., data of one of representations 68. In this example, server device 60 may periodically send template data, e.g., once every N segments, where N is an integer value. In some examples, the template data may be sent as a separate segment, while in other examples, the template data may be included in one of the segments.

The template data may include default audio and/or video data, as noted above. For example, the template data may include default video data, which may include a single picture to be displayed throughout the duration of the time corresponding to the lost video data. Alternatively, the default video data may include an animated scene. Likewise, the template data may include default audio data, such as music.

As illustrated in the example of FIG. 1, multimedia content 64 includes manifest file 66, which may correspond to a media presentation description (MPD). Manifest file 66 may contain descriptions of different alternative representations 68 (e.g., video services with different qualities) and the description may include, e.g., codec information, a profile value, a level value, a bitrate, and other descriptive characteristics of representations 68. Client device 40 may retrieve the MPD of a media presentation to determine how to access segments of representations 68. In conventional DASH, there are two ways to specify byte ranges. The first way is to explicitly put byte ranges into the individual fragment definitions, storing the byte ranges in the MPD XML. The second way is to fetch the byte range information from the segment index (SIDX) box in the MPEG file, and use that SIDX byte range information to issue byte range requests for media.

Web application 52 of client device 40 may comprise a web browser executed by a hardware-based processing unit of client device 40, or a plug-in to such a web browser. References to web application 52 should generally be understood to include either a web application, such as a web browser, a standalone video player, or a web browser incorporating a playback plug-in to the web browser. Web application 52 may retrieve configuration data (not shown) of client device 40 to determine decoding capabilities of video decoder 48 and rendering capabilities of video output 44 of client device 40.

The configuration data may also include any or all of a language preference selected by a user of client device 40, one or more camera perspectives corresponding to depth preferences set by the user of client device 40, and/or a rating preference selected by the user of client device 40. Web application 52 may comprise, for example, a web browser or a media client configured to submit HTTP GET and partial GET requests. Web application 52 may correspond to software instructions executed by one or more processors or processing units (not shown) of client device 40. In some examples, all or portions of the functionality described with respect to web application 52 may be implemented in hardware, or a combination of hardware, software, and/or firmware, where requisite hardware may be provided to execute instructions for software or firmware.

Web application 52 may compare the decoding and rendering capabilities of client device 40 to characteristics of representations 68 indicated by information of manifest file 66. Web application 52 may initially retrieve at least a portion of manifest file 66 to determine characteristics of representations 68. For example, web application 52 may request a portion of manifest file 66 that describes characteristics of one or more adaptation sets. Web application 52 may select a subset of representations 68 (e.g., an adaptation set) having characteristics that can be satisfied by the coding and rendering capabilities of client device 40. Web application 52 may then determine bitrates for representations in the adaptation set, determine a currently available amount of network bandwidth, and retrieve segments (or byte ranges) from one of the representations having a bitrate that can be satisfied by the network bandwidth.

In general, higher bitrate representations may yield higher quality video playback, while lower bitrate representations may provide sufficient quality video playback when available network bandwidth decreases. Accordingly, when available network bandwidth is relatively high, web application 52 may retrieve data from relatively high bitrate representations, whereas when available network bandwidth is low, web application 52 may retrieve data from relatively low bitrate representations. In this manner, client device 40 may stream multimedia data over network 74 while also adapting to changing network bandwidth availability of network 74.

As noted above, in some examples, client device 40 may provide user information to, e.g., server device 60 or other devices of a content distribution network. The user information may take the form of a browser cookie, or may take other forms. Web application 52, for example, may collect a user identifier, user identifier, user preferences, and/or user demographic information, and provide such user information to server device 60. Web application 52 may then receive a manifest file associated with targeted advertisement media content, to use to insert data from the targeted advertisement media content into media data of requested media content during playback. This data may be received directly as a result of a request for the manifest file, or a manifest sub-file, or this data may be received via an HTTP redirect to an alternative manifest file or sub-file (based on a supplied browser cookie, used to store user demographics and other targeting information).

At times, a user of client device 40 may interact with web application 52 using user interfaces of client device 40, such as a keyboard, mouse, stylus, touchscreen interface, buttons, or other interfaces, to request multimedia content, such as multimedia content 64. In response to such requests from a user, web application 52 may select one of representations 68 based on, e.g., decoding and rendering capabilities of client device 40. To retrieve data of the selected one of representations 68, web application 52 may sequentially request specific byte ranges of the selected one of representations 68. In this manner, rather than receiving a full file through one request, web application 52 may sequentially receive portions of a file through multiple requests.

In response to requests submitted by web application 52 to server device 60, network interface 54 may receive and provide data of received segments of a selected representation to web application 52. Alternatively, server device 60 may send segments to client device 40 using multicast or broadcast, in which case web application 52 may represent both a DASH client and a multicast service client (which may be executed by one or more processors of client device 40). In this example, the DASH client may request segments from the multicast service client using HTTP GET requests, and the multicast service client may respond to these requests using data of segments received via multicast or broadcast from server device 60.

In accordance with the techniques of this disclosure, web application 52 may determine whether one or more segments, or data thereof, has been lost. For example, web application 52 (or elements of network interface 54) may analyze sequence numbers of packets for the segments to determine whether one or more packets have been lost. Likewise, web application 52 (or elements of network interface 54) may analyze checksums of packets to determine whether data of a packet has been corrupted without the possibility of performing forward error correction (FEC), in order to determine whether the data of a segment should be deemed lost.

In some examples, packets in a network may never reach their destinations. In some examples, packets may arrive at client device 40, but may have arrived too late, that is, after a time when the packet would have been useful. For example, client device 40 may buffer data of received packets, e.g., to rearrange the order of the packets, to build up a buffer of media data in the event of a network bandwidth usage spike, or for other similar reasons. In the event that client device 40 determines that the buffer is about to "underflow," that is, have all data removed therefrom up to the point of a particular packet, and that packet has not yet arrived, client device 40 may determine that the packet is lost, and proceed to process data of subsequent packets. Thus, if the packet arrives after this point, the packet may be deemed to have arrived too late to be useful. In still other examples, data of a packet may be corrupted, e.g., due to channel noise, an improperly functioning network device along a network path, or due to other errors.

In any case, when one or more of the above errors occurs, client device 40 may deem data of a segment to be "lost." In the event of lost segment data, client device 40 may replace the lost segment data with template data, e.g., default audio and/or video data, in accordance with the techniques of this disclosure. For example, web application 52 may receive the template data once or periodically, e.g., in response to a unicast request or without a specific request, from server device 60. Web application 52 may store the template data in a memory (not shown) of client device 40. When web application 52 detects lost segment data, web application 52 may replace the lost segment data with the template data. In some examples, web application 52 may determine that an entire segment is lost, in which case web application 52 may replace the entire segment with the template data.

In other examples, web application 52 may determine that a portion of a segment was lost while another portion of the segment was received. In this case, web application 52 may replace the lost portion of the segment with the template data, but leave the received portion of the segment intact. In some examples, when web application 52 injects default audio and/or video data into the segment to replace a lost portion of the segment, web application 52 may need to set values for certain fields of the data. For example, web application 52 may need to construct headers or portions of headers for the default data, such as assigning values for frame number (frame_num) and/or picture order count (POC) values, to pictures of default video data. Frame_num values generally indicate a decoding order of the corresponding pictures, while POC values generally indicate a display order of the corresponding pictures. In this manner, client device 40 may ensure that received, uncorrupted data of the segment is correctly decodable and displayable along with the template data. When web application 52 replaces all or a portion of a segment with a segment including template data, the segment may be referred to as a "replacement segment."

In any case, web application 52 may provide data of received segments (or replacement segments, in accordance with the techniques of this disclosure) to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Video encoder 28, video decoder 48, audio encoder 26, audio decoder 46, encapsulation unit 30, web application 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder audio encoder 26, audio decoder 46, encapsulation unit 30, web application 52, and/or decapsulation unit 50 may comprise an integrated circuit, a microprocessor, and/or a wireless communication device, such as a cellular telephone or tablet computer.

In this manner, client device 40 represents an example of a device for presenting media data including one or more processors configured to determine that data for at least a portion of a segment of media data has been lost after a remaining portion of the segment has been received via a network transmission in accordance with dynamic adaptive streaming over HTTP (DASH), based on the determination, prior to decoding the media data, add default data to the segment to replace the data that has been determined to be lost to form a replacement segment, and output media data of the replacement segment.

Moreover, server device 60 represents an example of a device for sending information for video data that includes one or more processors configured to determine a representation of media content to be sent to at least one client device and determine default data corresponding to the determined representation, and one or more network interfaces configured to send the determined default data to the at least one client device to cause the at least one client device to replace lost data with the default data, and send media data of the determined representation to the at least one client device after sending the determined default data to the at least one client device.

Figure 2:
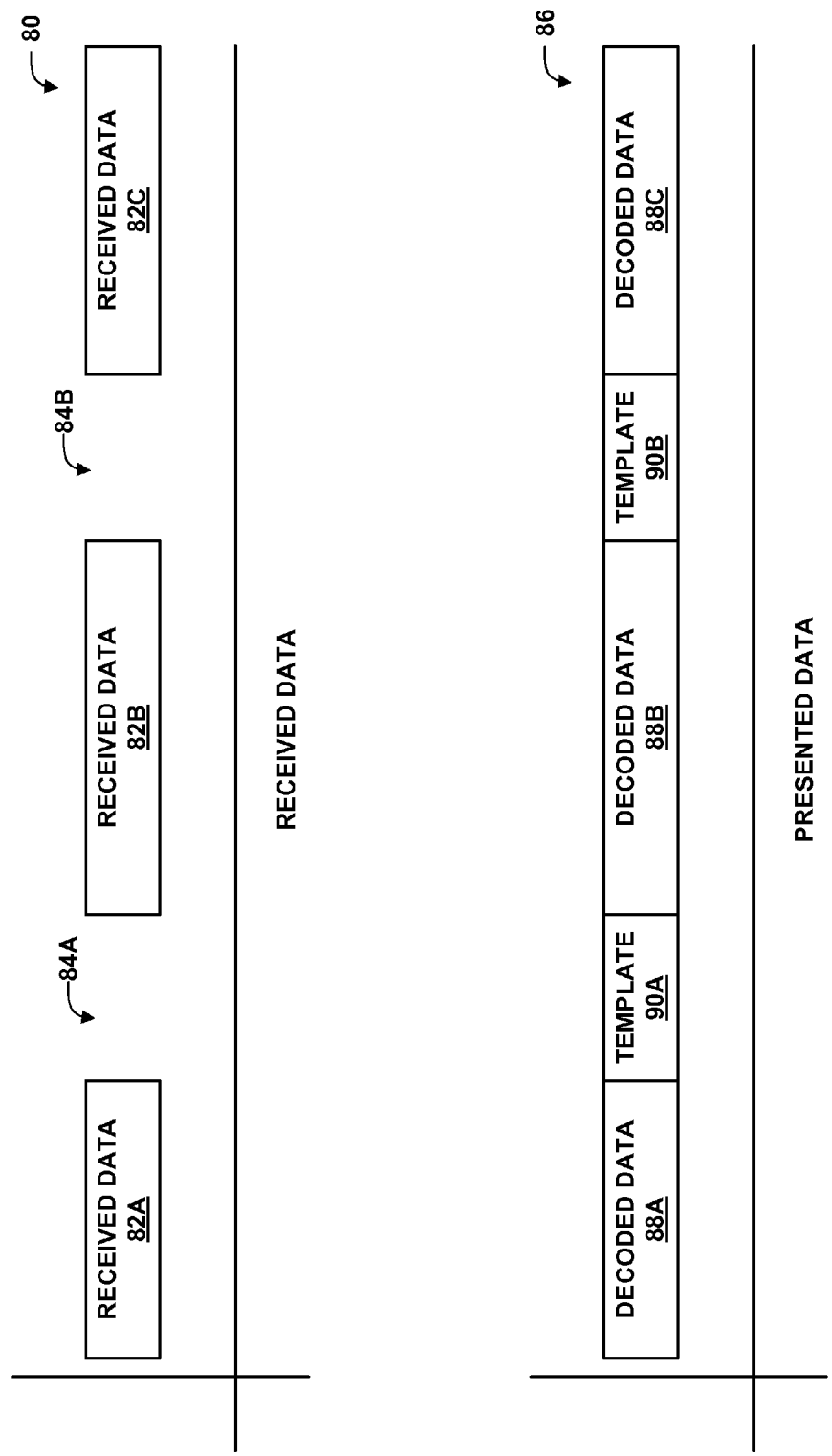
FIG. 2 is a conceptual diagram illustrating graph 80 representative of data received by a client device and graph 86 representative of data presented by the client device.

FIG. 2 is a conceptual diagram illustrating graph 80 representative of data received by a client device and graph 86 representative of data presented by the client device. The client device may comprise client device 40 (FIG. 1). In this example, client device 40 receives received data 82A, received data 82B, and received data 82C. As shown in FIG. 2, there are gaps 84A, 84B, representative of data that client device 40 determines to be lost. For example, based on analysis of sequence numbers of received packets of received data 82A, received data 82B, and received data 82C, and/or based on checksums of packets corresponding to gaps 84A, 84B, client device 40 may determine that data for gaps 84A, 84B is lost, e.g., due to not having arrived or having become corrupted.

In accordance with the techniques of this disclosure, prior to receiving received data 82A, client device 40 may receive template data, which may include default audio and/or video data. Therefore, as shown in graph 86, client device 40 may present decoded data 88A corresponding to received data 82A, decoded data 88B corresponding to received data 82B, and decoded data 88C corresponding to received data 82C. Moreover, rather than presenting a blank screen corresponding to gaps 84A, 84B, client device 40 may present template data 90A, 90B corresponding to gaps 84A, 84B, respectively. Template data 90A, 90B as presented may include decoded default audio and/or video data, or encoded audio and/or video data to be subsequently decoded. By presenting default data, client device 40 may provide a more pleasant experience for an end user of client device 40.

Figure 3:
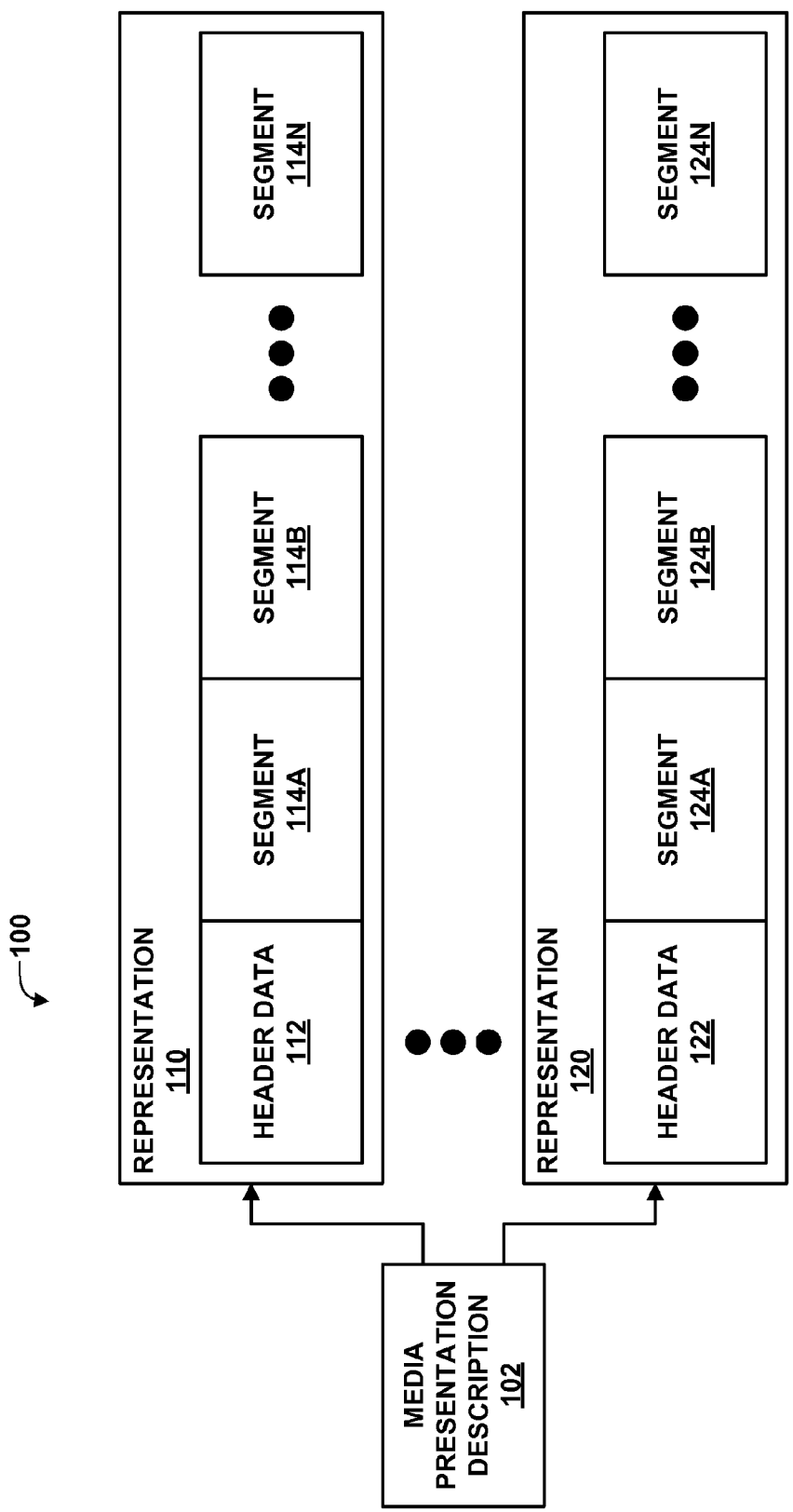
FIG. 3 is a conceptual diagram illustrating elements of an example multimedia content.

FIG. 3 is a conceptual diagram illustrating elements of an example multimedia content 100. Multimedia content 100 may correspond to multimedia content 64 (FIG. 1), or another multimedia content stored in storage medium 62. In the example of FIG. 3, multimedia content 100 includes media presentation description (MPD) 102 and a plurality of representations 110-120. Representation 110 includes optional header data 112 and segments 114A-114N (segments 114), while representation 120 includes optional header data 122 and segments 124A-124N (segments 124). Ellipses between representations 110 and 120 are intended to represent additional representations that are not shown in FIG. 3, which may include respective header data and segments. The letter N is used to designate the last segment in each of representations 110-120 as a matter of convenience. In some examples, there may be different numbers of segments in representations 110-120.

MPD 102 may comprise a data structure separate from representations 110-120. MPD 102 may correspond to manifest file 66 of FIG. 1. Likewise, representations 110-120 may correspond to representations 68 of FIG. 1. In general, MPD 102 may include data that generally describes characteristics of representations 110-120, such as coding and rendering characteristics, adaptation sets, text type information, camera angle information, rating information, trick mode information (e.g., information indicative of representations that include temporal sub-sequences for trick modes, such as fast forward and rewind), and/or information for retrieving template data.

In accordance with the techniques of this disclosure, template data may include default audio and/or video data, to be used to replace lost media data, as well as data indicating how such replacements are to occur (e.g., fields to be filled in by a client device, such as frame number fields and/or POC value fields of pictures of video data). MPD 102 may include information for one or more of representations 110-120 indicating a template corresponding to each of representations 110-120. As explained below, each of representations 110-120 may have an individual set of template data, and the template data for different representations may be different. Alternatively, as also explained below, the same set of template data may apply to a plurality of representations, e.g., to each of the representations of an adaptation set. MPD 102 may further include information for retrieving the template data, e.g., when the template data is available for retrieval via unicast. In some examples, client devices, such as client device 40, may be configured to independently retrieve template data via unicast, even when the client devices receive media data via broadcast or multicast.

In some examples, different default audio and/or video data may be provided for each of representations 110-120. For example, default video data may have the same coding and rendering characteristics of a corresponding representation. For representations having three-dimensional video data, the default video data may include three-dimensional video data as well. The default video data may also have a spatial resolution that is the same as the spatial resolution of the corresponding representation.

In some examples, template data including default audio and video data may be provided for a single adaptation set. Thus, rather than having unique sets of default audio and video data for each representation, there may be a set of default audio and video data for each adaptation set. The default audio and video data may therefore have the same coding and rendering characteristics as the corresponding adaptation set, but not necessarily the same bitrate as a representation within the adaptation set, such as a currently selected representation for unicast, broadcast, or multicast.

Header data 112, when present, may describe characteristics of segments 114, e.g., temporal locations of random access points, which of segments 114 includes random access points, byte offsets to random access points within segments 114, uniform resource locators (URLs) of segments 114, or other aspects of segments 114. Header data 122, when present, may describe similar characteristics for segments 124. Additionally or alternatively, such characteristics may be fully included within MPD 102. Likewise, in accordance with the techniques of this disclosure, header data 112 may include an indication of a relevant template to use if data of one or more of segments 114 is lost (e.g., does not arrive, arrives too late, or is corrupted in transit).

Segments 114 include one or more coded video samples, each of which may include frames or slices of video data. Each of the coded video samples of segments 114 may have similar characteristics, e.g., height, width, and bandwidth requirements. Such characteristics may be described by data of MPD 102, though such data is not illustrated in the example of FIG. 3. MPD 102 may include characteristics as described by the 3GPP Specification, with the addition of any or all of the signaled information described in this disclosure. In some examples, in accordance with the techniques of this disclosure, one or more of segments 114 may include default data of a template that may be used to replace data of other ones of segments 114 in the event of a loss of data, e.g., one or more packets that do not arrive, arrive too late, or include corrupted data. Similarly, one or more of segments 124 may also include template data. Alternatively, default audio and video data may be sent in a separate transmission, separately from data of representations 110-120.

Each of segments 114, 124 may be associated with a unique uniform resource identifier (URI), e.g., a uniform resource locator (URL). Thus, each of segments 114, 124 may be independently retrievable using a streaming network protocol, such as DASH. In this manner, a destination device, such as client device 40, may use an HTTP Get request to retrieve segments 114 or 124. In some examples, client device 40 may use HTTP partial GET requests to retrieve specific byte ranges of segments 114 or 124. Alternatively, a server device, such as server device 60 (FIG. 1) may multicast or broadcast segments of a representation, such that client device 40 need only request to receive data of the multicast or broadcast, e.g., by joining a multicast group.

Figure 4:
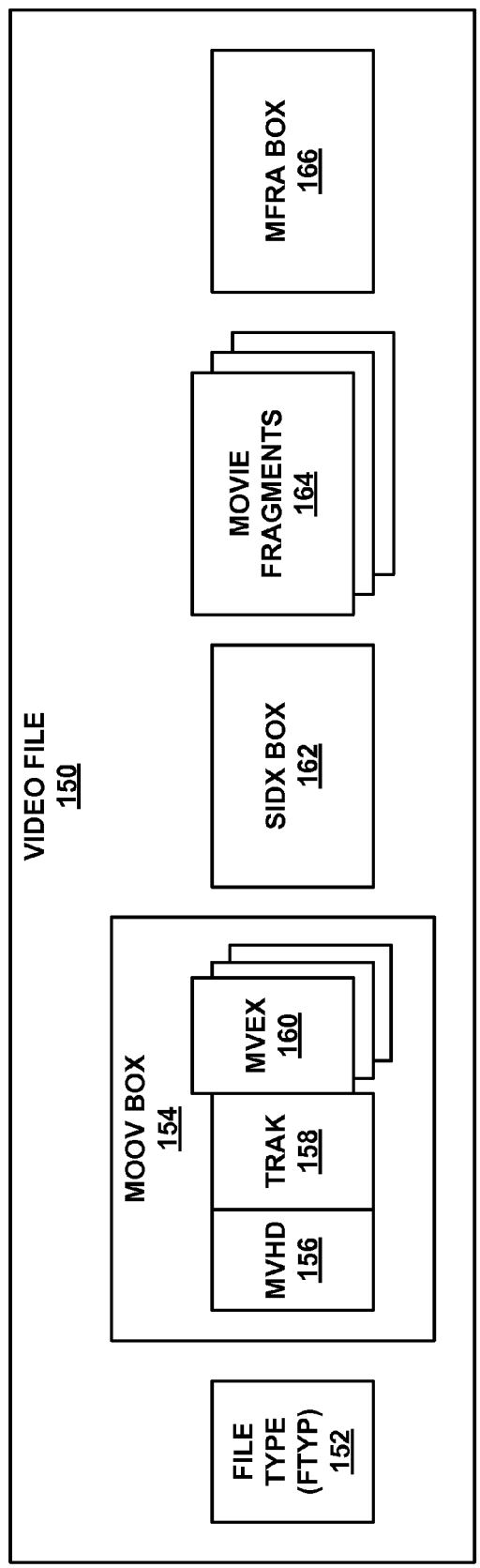
FIG. 4 is a block diagram illustrating elements of an example video file, which may correspond to a segment of a representation of multimedia content.

FIG. 4 is a block diagram illustrating elements of an example video file 150, which may correspond to a segment of a representation, such as one of segments 114, 124 of FIG. 3. Each of segments 114, 124 may include data that conforms substantially to the arrangement of data illustrated in the example of FIG. 4. As described above, video files in accordance with the ISO base media file format and extensions thereof store data in a series of objects, referred to as "boxes." In the example of FIG. 4, video file 150 includes file type (FTYP) box 152, movie (MOOV) box 154, movie fragments 164 (also referred to as movie fragment boxes (MOOF)), and movie fragment random access (MFRA) box 164.

Video file 150 generally represents an example of a segment of multimedia content, which may be included in one of representations 110-120 (FIG. 3). In this manner, video file 150 may correspond to one of segments 114, one of segments 124, or a segment of another representation. In accordance with the techniques of this disclosure, media data, such as data of video file 150, that is lost may be replaced by template media data. The template data may be sent in a video file that conforms substantially to video file 150. Assuming that video file 150 represents media data of a selected representation, data may be "lost" in that one or more packets representative of video file 150 may not arrive or may arrive too late to be useful, or data corresponding to movie fragments 164 may become corrupted.

In the event that an entire segment, such as an entire video file, is lost, client device 40 may replace the entire segment with a replacement segment including template data, such as default audio and/or video data. In the event that a portion of a segment, such as one or more of movie fragments 164, becomes corrupted, client device 40 may replace only the portion of the segment with template data. For example, if a sequence of movie fragments 164 is corrupted, or if one or more packets corresponding to a sequence of movie fragments 164 are lost, client device 40 may replace the lost or corrupted data of movie fragments 164 with template data, e.g., default audio and/or video data, in accordance with the techniques of this disclosure.

In the example of FIG. 4, video file 150 includes one segment index (SIDX) box 161. In some examples, video file 150 may include additional SIDX boxes, e.g., between movie fragments 164. In general, SIDX boxes, such as SIDX box 162, include information that describes byte ranges for one or more of movie fragments 164. In other examples, SIDX box 162 and/or other SIDX boxes may be provided within MOOV box 154, following MOOV box 154, preceding or following MFRA box 166, or elsewhere within video file 150.

File type (FTYP) box 152 generally describes a file type for video file 150. File type box 152 may include data that identifies a specification that describes a best use for video file 150. File type box 152 may be placed before MOOV box 154, movie fragment boxes 162, and MFRA box 166.

MOOV box 154, in the example of FIG. 4, includes movie header (MVHD) box 156, track (TRAK) box 158, and one or more movie extends (MVEX) boxes 160. In general, MVHD box 156 may describe general characteristics of video file 150. For example, MVHD box 156 may include data that describes when video file 150 was originally created, when video file 150 was last modified, a timescale for video file 150, a duration of playback for video file 150, or other data that generally describes video file 150.

TRAK box 158 may include data for a track of video file 150. TRAK box 158 may include a track header (TKHD) box that describes characteristics of the track corresponding to TRAK box 158. In some examples, TRAK box 158 may include coded video pictures, while in other examples, the coded video pictures of the track may be included in movie fragments 164, which may be referenced by data of TRAK box 158.

In some examples, video file 150 may include more than one track, although this is not necessary for the DASH protocol to work. Accordingly, MOOV box 154 may include a number of TRAK boxes equal to the number of tracks in video file 150. TRAK box 158 may describe characteristics of a corresponding track of video file 150. For example, TRAK box 158 may describe temporal and/or spatial information for the corresponding track. A TRAK box similar to TRAK box 158 of MOOV box 154 may describe characteristics of a parameter set track, when encapsulation unit 30 (FIG. 1) includes a parameter set track in a video file, such as video file 150. Encapsulation unit 30 may signal the presence of sequence level SEI messages in the parameter set track within the TRAK box describing the parameter set track.

MVEX boxes 160 may describe characteristics of corresponding movie fragments 164, e.g., to signal that video file 150 includes movie fragments 164, in addition to video data included within MOOV box 154, if any. In the context of streaming video data, coded video pictures may be included in movie fragments 164 rather than in MOOV box 154. Accordingly, all coded video samples may be included in movie fragments 164, rather than in MOOV box 154.

MOOV box 154 may include a number of MVEX boxes 160 equal to the number of movie fragments 164 in video file 150. Each of MVEX boxes 160 may describe characteristics of a corresponding one of movie fragments 164. For example, each MVEX box may include a movie extends header box (MEHD) box that describes a temporal duration for the corresponding one of movie fragments 164.

Movie fragments 164 may include one or more coded video pictures, as well as coded audio data (also referred to as coded audio samples), textual overlays (e.g., for closed captioning), or other media data. In some examples, movie fragments 164 may include one or more groups of pictures (GOPs), each of which may include a number of coded video pictures, e.g., frames or pictures. Each of the movie fragments 164 may include a movie fragment header box (MFHD, not shown in FIG. 4). The MFHD box may describe characteristics of the corresponding movie fragment, such as a sequence number for the movie fragment. Movie fragments 164 may be included in order of sequence number in video file 150.

MFRA box 166 may describe random access points within movie fragments 164 of video file 150. This may assist with performing trick modes, such as performing seeks to particular temporal locations within video file 150, as well as fast forward or rewind modes. MFRA box 166 is generally optional and need not be included in video files. Likewise, a client device, such as client device 40, does not necessarily need to reference MFRA box 166 to correctly decode and display video data of video file 150. MFRA box 166 may include a number of track fragment random access (TFRA) boxes (not shown) equal to the number of tracks of video file 150, or in some examples, equal to the number of media tracks (e.g., non-hint tracks) of video file 150.

Figure 5:
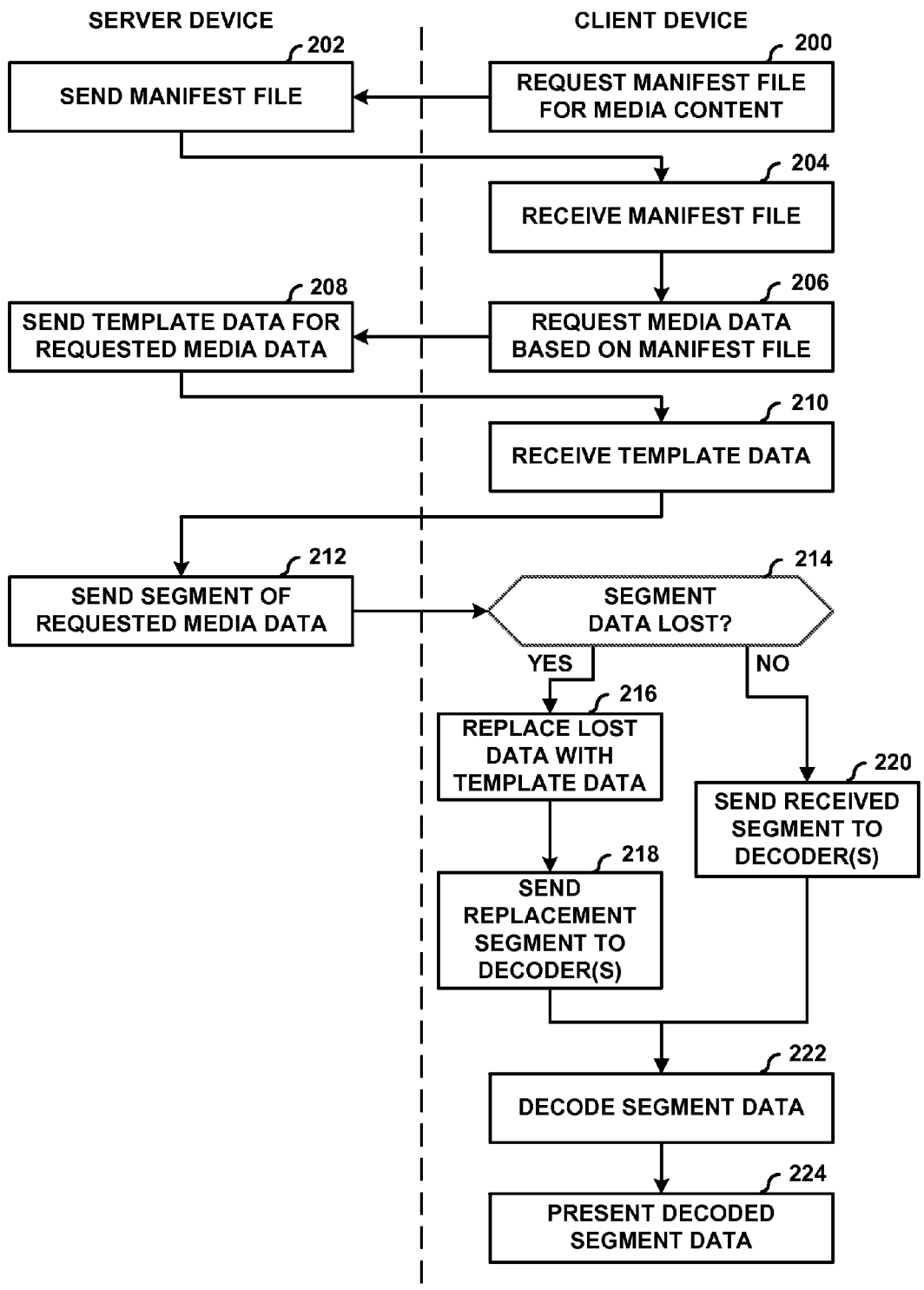
FIG. 5 is a flowchart illustrating an example method for providing and using template data to replace lost media data.

FIG. 5 is a flowchart illustrating an example method for providing and using template data to replace lost media data. As noted herein, the template data may comprise default video and/or audio data. In the example of FIG. 5, a client device (e.g., client device 40) and a server device (e.g., server device 60) participate in the method. In other examples, additional or alternative devices may also participate in the method.

In the example of FIG. 5, client device 40 may initially request a manifest file for media content (200). The request may be directed to server device 60, e.g., for unicast, or an indirect request to subscribe to a multicast group. Server device 60 may send the manifest file to client device 40 in response to the request (202), as shown in the example of FIG. 5. Alternatively, server device 60 may provide the manifest file to a multicast group initially for a network multicast. In any case, client device 40 may receive the manifest file (204) and request media data based on the manifest file (206). For example, client device 40 may select a representation based on coding and rendering characteristics and bitrates of the representations descried by the manifest file, and request a segment of the selected representation. Alternatively, in the context of multicast or broadcast, there may be only one representation available, namely, a representation selected by server device 60. In some examples, the manifest file may include an IP address of a multicast group associated with the media content, or other information for receiving data of a multicast.

In this example, server device 60 may send template data for the requested media data (208). In examples where media data is sent via broadcast or multicast, the template data sent may correspond to a representation selected by server device 60. The template data may include default audio and video data, as well as any other information for using the default audio/video data. For example, the template data may include information indicating one or more fields of header data to be filled in, such as frame_num and/or POC values, as well as any other relevant information, such as PPS, SPS, and or SEI messages relevant to the template data. The template data may be encapsulated as a separate segment, such as a template segment substantially conforming to video file 150 (FIG. 4).

Alternatively, the template data may be included in a segment including media data of the corresponding media content.

In some examples, the manifest file may include a URL for a segment including the template data. In such examples, client device 40 may further submit a request to retrieve the template data, e.g., using a separate HTTP GET or partial GET request. Thus, the template data may be sent via unicast, broadcast, or multicast network transmission, and may be sent in band with the requested media data or out of band, that is, as a separate network transmission from the requested media data, which may be sent via a separate communication channel, either physical or logical. In any case, client device 40 may receive the template data from server device 60 (210). In some examples, client device 40 may receive the template data from a separate server device than the server device providing the media data. Although illustrated as separate steps in the example of FIG. 5, it should be understood that sending template data for media content (e.g., step 208) and sending requested media data (e.g., step 212) may occur in parallel, or may occur as a single step. For example, a segment of requested media data (or another portion of the media content) may include the template data.

Server device 60 may also send a segment of the requested media data (212). In unicast transmissions, server device 60 may send a segment (or portion of a segment) corresponding to a URL specified in an HTTP GET or partial GET request, while in multicast or broadcast transmissions, server device 60 may send the next available segment without waiting for a request from a client device. Client device 40 may then determine whether data of the segment was lost (214). For example, client device 40 may analyze sequence numbers of received packets to determine whether one or more packets for the expected segment did not arrive at all, or did not arrive in time to be useful. As another example, client device 40 may determine whether one or more packets of a segment include corrupted data, e.g., using checksums of the packets.

In any case, when client device 40 determines that data of a segment is lost ("YES" branch of 214), client device 40 may construct a replacement segment by replacing the lost data with template data (216), corresponding to the template data received at step 210. For example, if all of the data of the packet did not arrive, client device 40 may replace the entire segment with default audio and/or video data of the template data. Alternatively, if a portion of the segment arrived but another portion of the segment did not arrive, client device 40 may replace the portion of the segment that did not arrive with the default audio and/or video data of the template data.

Client device 40 may then send the replacement segment to decapsulation unit 50, which may in turn provide decapsulated, encoded audio data to audio decoder 46 and decapsulated, encoded video data to video decoder 48 (218). On the other hand, if data of the segment was not lost ("NO" branch of 214), client device 40 may send the received segment to decapsulation unit 50, which may in turn provide decapsulated, encoded audio data to audio decoder 46 and decapsulated, encoded video data to video decoder 48 (220). Audio decoder 46 may decode encoded audio data, while video decoder 48 may decode encoded video data of the segment (222), whether the segment is a replacement segment or an unmodified, received segment. Thus, from the perspectives of audio decoder 46 and video decoder 48, the data of the segment would not appear to have been modified or replaced by default data. Instead, the data of the segment would appear to be expected encoded audio or video data. For example, for video data of a replacement segment, client device 40 may provide proper values for frame_num values and/or POC values, to ensure that video decoder 48 is able to properly decode the default video data.

After decoding, client device 40 may present the decoded audio and video data (224). For example, audio output 42 may present decoded audio data, while video output 44 may display decoded video data. As noted above, in the event of loss of data for a segment, there may be a slight discontinuity between the transmitted media data and the presented media data, but the media data as presented in this event provides a better user experience than simply presenting a blank screen, in the case of default video data.

In this manner, FIG. 5 represents an example of a method of presenting media data, the method including determining that data for at least a portion of a segment of media data has been lost after a remaining portion of the segment has been received via a network transmission in accordance with dynamic adaptive streaming over HTTP (DASH), based on the determination, prior to decoding the media data, adding default data to the segment to replace the data that has been determined to be lost to form a replacement segment, and outputting media data of the replacement segment.

FIG. 5 also represents an example of a method of sending information for media data, the method including determining a representation of media content to be sent to at least one client device, determining default data corresponding to the determined representation, sending the determined default data to the at least one client device to cause the at least one client device to replace lost data with the default data, and sending media data of the determined representation to the at least one client device after sending the determined default data to the at least one client device.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing media data, the method comprising, by a processing unit separate from a decoder and that processes the media data before frames of the media data are decoded by the decoder:
   determining that data for at least a portion of a segment of media data has been lost after a remaining portion of the segment has been received via a network transmission in accordance with dynamic adaptive streaming over HTTP (DASH), wherein the media data of the segment includes a first plurality of frames, wherein the first plurality of frames are coded without reference to frames external to the segment, and wherein the data that has been lost includes a second plurality of frames that is a subset of the first plurality of frames;
   based on the determination, prior to the decoder decoding any of the frames of the media data of the segment, adding default data to the segment to replace the data that has been determined to be lost to form a replacement segment such that a duration of the added default data is equal to a duration of the number of frames in the second plurality of frames; and
   outputting media data of the replacement segment to the decoder.

2. The method of claim 1, wherein determining that the data for the at least portion of the segment has been lost comprises determining that at least one packet of the segment has not arrived or has been corrupted.

3. The method of claim 1, wherein adding default data comprises adding at least one of default audio data and default video data to the segment.

4. The method of claim 1, wherein adding default data comprises adding default video data to the segment, and wherein the default video data comprises one of a logo screen of a network from which the remaining portion of the segment was received, a seasonally relevant display, and a content-relevant display.

5. The method of claim 1, wherein adding default data comprises adding content-relevant audio data to the segment.

6. The method of claim 1, further comprising modifying a header of the segment based on the addition of the default data.

7. The method of claim 1, further comprising receiving information defining the default data.

8. The method of claim 7, wherein receiving the information defining the default data comprises receiving the information defining the default data as part of the network transmission.

9. The method of claim 7, wherein receiving the information defining the default data comprises receiving the information defining the default data as side information.

10. The method of claim 1, further comprising retrieving configuration data indicative of the default data.

11. The method of claim 1, wherein the media data comprises video data, wherein the decoder comprises a video decoder, and wherein outputting comprises sending the video data of the replacement segment to the video decoder.

12. The method of claim 11, wherein adding the default data comprises assigning values for at least one of a frame number and a picture order count (POC) value to pictures of the default data.

13. The method of claim 1, wherein the media data comprises audio data, wherein the decoder comprises an audio decoder, and wherein outputting comprises sending the audio data of the replacement segment to the audio decoder.

14. The method of claim 1, wherein the default data comprises data that is separate and independent from the media data and does not result from loss correction or corruption correction techniques.

15. The method of claim 1, further comprising receiving the default data prior to receiving any data of the segment.

16. A device for processing media data, the device comprising:
   a decoder; and
   one or more processors separate from the decoder and that the media data before frames of the media data are decoded by the decoder, wherein the one or more processors are configured to:
      determine that data for at least a portion of a segment of media data has been lost after a remaining portion of the segment has been received via a network transmission in accordance with dynamic adaptive streaming over HTTP (DASH), wherein the media data of the segment includes a first plurality of frames, wherein the first plurality of frames are coded without reference to frames external to the segment, and wherein the data that has been lost includes a second plurality of frames that is a subset of the first plurality of frames;
      based on the determination, prior to the decoder decoding any of the frames of the media data of the segment, add default data to the segment to replace the data that has been determined to be lost to form a replacement segment such that a duration of the added default data is equal to a duration of the number of frames in the second plurality of frames; and output media data of the replacement segment to the decoder.

17. The device of claim 16, wherein the one or more processors are configured to determine that the data for the at least portion of the segment has been lost when at least one packet of the segment has not arrived or has been corrupted.

18. The device of claim 16, wherein the one or more processors are configured to add at least one of default audio data and default video data to the segment.

19. The device of claim 16, wherein the one or more processors are further configured to receive information defining the default data.

20. The device of claim 16, wherein the decoder comprises a video decoder, wherein the media data comprises video data, and wherein the one or more processors are configured to send the video data of the replacement segment to the video decoder.

21. The device of claim 20, wherein the one or more processors are configured to assign values for at least one of a frame number and a picture order count (POC) value to pictures of the default data.

22. The device of claim 16, wherein the default data comprises data that is separate and independent from the media data and does not result from loss correction or corruption correction techniques.

23. The device of claim 16, wherein the one or more processors are configured to receive the default data prior to receiving any data of the segment.

24. A device for processing media data, the device comprising:

a decoder;

means, separate from the decoder and that processes the media data before frames of the media data are decoded by the decoder, for determining that data for at least a portion of a segment of media data has been lost after a remaining portion of the segment has been received via a network transmission in accordance with dynamic adaptive streaming over HTTP (DASH), wherein the media data of the segment includes a first plurality of frames, wherein the first plurality of frames are coded without reference to frames external to the segment, and wherein the data that has been lost includes a second plurality of frames that is a subset of the first plurality of frames;

means, separate from the decoder and that processes the media data before frames of the media data are decoded by the decoder, for adding, based on the determination, prior to the decoder decoding any of the frames of the media data of the segment, default data to the segment to replace the data that has been determined to be lost to form a replacement segment such that a duration of the added default data is equal to a duration of the number of frames in the second plurality of frames; and means, separate from the decoder and that processes the media data before frames of the media data are decoded by the decoder, for outputting media data of the replacement segment to the decoder.

25. The device of claim 24, wherein the means for determining that the data for the at least portion of the segment has been lost comprises means for determining that at least one packet of the segment has not arrived or has been corrupted.

26. The device of claim 24, wherein the means for adding default data comprises means for adding at least one of default audio data and default video data to the segment.

27. The device of claim 24, further comprising means for receiving information defining the default data.

28. The device of claim 27, wherein the means for receiving the information defining the default data comprises means for receiving the information defining the default data as part of the network transmission.

29. The device of claim 27, wherein the means for receiving the information defining the default data comprises means for receiving the information defining the default data as side information.

30. The device of claim 24, wherein the decoder comprises a video decoder, wherein the media data comprises video data, and wherein the means for outputting comprises means for sending the video data of the replacement segment to the video decoder.

31. The device of claim 30, wherein the means for adding the default data comprises means for assigning values for at least one of a frame number and a picture order count (POC) value to pictures of the default data.

32. The device of claim 24, wherein the default data comprises data that is separate and independent from the media data and does not result from loss correction or corruption correction techniques.

33. The device of claim 24, further comprising means for receiving the default data prior to receiving any data of the segment.

34. A computer-readable storage medium having stored thereon instructions that, when executed, cause one or more processors, separate from a decoder and that process the media data before frames of the media data are decoded by the decoder, to:

determine that data for at least a portion of a segment of media data has been lost after a remaining portion of the segment has been received via a network transmission in accordance with dynamic adaptive streaming over HTTP (DASH), wherein the media data of the segment includes a first plurality of frames, wherein the first plurality of frames are coded without reference to frames external to the segment, and wherein the data that has been lost includes a second plurality of frames that is a subset of the first plurality of frames;

based on the determination, prior to the decoder decoding any of the frames of the media data of the segment, add default data to the segment to replace the data that has been determined to be lost to form a replacement segment such that a duration of the added default data is equal to a duration of the number of frames in the second plurality of frames; and output media data of the replacement segment to the decoder.

35. The computer-readable storage medium of claim 34, wherein the instructions that cause the one or more processors to determine that the data for the at least portion of the segment has been lost comprise instructions that cause the one or more processors to determine that at least one packet of the segment has not arrived or has been corrupted.

36. The computer-readable storage medium of claim 34, wherein the instructions that cause the one or more processors to add default data comprise instructions that cause the one or more processors to add at least one of default audio data and default video data to the segment.

37. The computer-readable storage medium of claim 34, further comprising instructions that cause the one or more processors to receive information defining the default data.

38. The computer-readable storage medium of claim 37, wherein the instructions that cause the one or more processors to receive the information defining the default data comprise instructions that cause the one or more processors to receive the information defining the default data as part of the network transmission.

39. The computer-readable storage medium of claim 37, wherein the instructions that cause the one or more processors to receive the information defining the default data comprise instructions that cause the one or more processors to receive the information defining the default data as side information.

40. The computer-readable storage medium of claim 34, wherein the media data comprises video data, wherein the decoder comprises a video decoder, and wherein the instructions that cause the one or more processors to output comprise instructions that cause the one or more processors to send the video data of the replacement segment to the video decoder.

41. The computer-readable storage medium of claim 40, wherein the instructions that cause the one or more processors to add the default data comprise instructions that cause the one or more processors to assign values for at least one of a frame number and a picture order count (POC) value to pictures of the default data.

42. The computer-readable storage medium of claim 34, wherein the default data comprises data that is separate and independent from the media data and does not result from loss correction or corruption correction techniques.

43. The computer-readable storage medium of claim 34, further comprising instructions that cause the processor to receive the default data prior to receiving any data of the segment.

\* \* \* \* \*